(12) United States Patent
Austin et al.

(10) Patent No.: US 11,447,140 B2
(45) Date of Patent: Sep. 20, 2022

(54) COGNITIVE TUNNELING MITIGATION DEVICE FOR DRIVING

(71) Applicant: TOYOTA MOTOR ENGINEERING & MANUFACTURING NORTH AMERICA, INC., Plano, TX (US)

(72) Inventors: Benjamin P. Austin, Saline, MI (US); John K. Lenneman, Okemos, MI (US); Joshua E. Domeyer, Madison, WI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 36 days.

(21) Appl. No.: 17/074,720

(22) Filed: Oct. 20, 2020

(65) Prior Publication Data
US 2022/0118985 A1  Apr. 21, 2022

(51) Int. Cl.
*B60W 40/09* (2012.01)
*G06N 3/08* (2006.01)
(Continued)

(52) U.S. Cl.
CPC ............. *B60W 40/09* (2013.01); *G06N 3/084* (2013.01); *G06N 20/00* (2019.01); *G06V 20/56* (2022.01);
(Continued)

(58) Field of Classification Search
CPC ............. B60W 40/09; B60W 2540/18; B60W 2540/22; B60W 2540/221;
(Continued)

(56) References Cited

U.S. PATENT DOCUMENTS 9,139,087 B2   9/2015   Tuzsuzov
9,619,721 B2   4/2017   Bogner et al.
(Continued)

FOREIGN PATENT DOCUMENTS

JP   2013-171546 A   9/2013
WO   2018/144537 A1   8/2018

OTHER PUBLICATIONS

Reimer ; Impact of Cognitive Task Complexity on Driver's Visual Tunneling ; Transportation Research Record: Journal of Transportation Research Board, No. 2139 ; pp. 13-19 ; 2009 ; 7 Pages.
(Continued)

*Primary Examiner* — Omar Casillashernandez
(74) *Attorney, Agent, or Firm* — Oblon, McClelland, Maier & Neustadt, L.L.P.

(57) ABSTRACT

A driver monitor method and system for mitigating cognitive tunneling in a vehicle includes in-cabin video cameras, a heart rate monitor, an audio-visual device, and processing circuitry that detects eye gaze direction, eye lid position, and head position using images from the in-cabin video cameras, and measures heart rate variability using the heart rate monitor. A machine learning device uses the eye gaze direction, eye lid position, head position, and heart rate variability to predict whether a driver is transitioning into a cognitive tunneling state or a fatigue state. The audio-visual device outputs one audio-visual cue to mitigate the cognitive tunneling state and outputs a different cue to mitigate the fatigue state. The machine learning device learns by performing a reinforcement learning algorithm in which the
(Continued)

audio-video device outputs a verification request and receives a response to the verification request that is fed back to the machine learning device.

20 Claims, 8 Drawing Sheets

(51) Int. Cl.
*G06N 20/00* (2019.01)
*G06V 20/56* (2022.01)
*G06V 20/59* (2022.01)
*G06V 40/19* (2022.01)

(52) U.S. Cl.
CPC ............ *G06V 20/597* (2022.01); *G06V 40/19* (2022.01); *B60W 2540/18* (2013.01); *B60W 2540/22* (2013.01); *B60W 2540/221* (2020.02); *B60W 2540/223* (2020.02); *B60W 2540/225* (2020.02)

(58) Field of Classification Search
CPC ...... B60W 2540/223; B60W 2540/225; G06N 3/084; G06N 20/00; G06V 20/56; G06V 20/597; G06V 40/19
USPC .......................................................... 340/576
See application file for complete search history.

(56) References Cited

U.S. PATENT DOCUMENTS

| | | | |
|---|---|---|---|
| 10,150,351 B2 | 12/2018 | Lin et al. | |
| 10,293,768 B2 | 5/2019 | Sham | |
| 10,339,781 B2 | 7/2019 | Kaplan et al. | |
| 10,376,198 B1 * | 8/2019 | Flaherty-Woods | ......................... A61B 5/1103 |
| 10,467,488 B2 * | 11/2019 | Sicconi | .................... G06F 3/017 |
| 10,638,938 B1 * | 5/2020 | Tzvieli | ................. A61B 5/0075 |
| 2014/0167968 A1 * | 6/2014 | Tuzsuzov | ............. B60K 28/066 340/576 |
| 2016/0001781 A1 * | 1/2016 | Fung | ...................... B60R 25/25 701/36 |
| 2017/0106858 A1 * | 4/2017 | Li | ......................... B60W 10/18 |
| 2017/0282792 A1 | 10/2017 | Illy | |
| 2018/0133431 A1 * | 5/2018 | Malchano | .......... A61N 1/36036 |
| 2020/0012872 A1 * | 1/2020 | Autran | ................. G05D 1/0088 |

OTHER PUBLICATIONS

Regis, et al. ; Formal Detection of Attentional Tunneling in Human Operator-Automation Interactions ; IEEE Transactions on Human-Machine Systems, vol. 44, No. 3 ; Jun. 2014 ; 11 Pages.

* cited by examiner

COGNITIVE TUNNELING MITIGATION DEVICE FOR DRIVING

BACKGROUND

Technical Field

The present disclosure is directed to a technique for distinguishing between driver cognitive attention tunneling and fatigue so that an appropriate stimulus can be applied.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The ability to focus one's attention on a single item is considered an essential mechanism of human information processing. However, there are cases where attention focus may be at the expense of neglecting events that may be crucial for safety purposes. In these situations, this attentional tunneling, or cognitive tunneling, may lead to excessive focus and poor decision making. Attentional tunneling has been defined as the allocation of attention to a particular channel of information for a duration that is longer than optimal, given a cost of neglecting events or failure to perform other tasks. Cognitive tunneling in the case of a vehicle driver is an attentional state of a person where they are focused on something or deep in thought while tuning out all else when operating a vehicle. The driver is driving the vehicle, but may be neglecting crucial cues or failing to perform a driving task. Although cognitive tunneling may involve neglecting crucial cues or failing to perform a driving task, it is a different state from driver fatigue or drowsiness, and other reduced attentional states. While in a cognitive tunneling state, a driver's eye gaze direction may be away from the road or vehicle surroundings for what may be an unusual amount of time while the vehicle is moving. While in the cognitive tunneling state, a driver may appear to stare, but without focusing on objects in the vicinity of the vehicle. While in a cognitive tunneling state, the driver's heart rate may vary in a pattern that does not reflect the current driving conditions.

Driver fatigue or drowsiness is a state of a driver characterized by lowering of the eyelids (measured by percent of eye closure—PERCLOS), possibly in combination with other signs such as lower heart rate, yawning, and head dropping. Sometimes a driver suffering from driver fatigue or drowsiness may shake his/her head in an effort to fight off fatigue. In some cases, when the vehicle is stopped, such as at a stop light, the driver may close his/her eyes for an extended period in an effort to rest their eyes.

Cognitive tunneling is a potentially dangerous condition in cases that require quick action. For example, a driver whose thoughts are not focused on driving may be faced with a situation in which another vehicle suddenly cuts in front of the driver's vehicle and slows down to merge into the same lane. A driver in a cognitive tunneling state may be faced with a situation where vehicles in traffic ahead of the driver's vehicle suddenly slow down. A driver in a cognitive tunneling state may be faced with a situation where an emergency vehicle heads toward the vicinity of the driver's vehicle, requiring the driver to take quick appropriate action. A driver in a cognitive tunneling state may not notice traffic signs and may react slowly to traffic signals, such as yellow light, or even red light signal. Each of these situations is potentially dangerous and may even be fatal if not responded to immediately.

Although cognitive tunneling involves an excessive focus of attention and driver fatigue is a reduced attentional capacity, each may be treated in a different manner in an effort to mitigate the respective attention state.

Various methods have been proposed for detecting driver fatigue and applying stimulus to mitigate the fatigued state. U.S. Pat. No. 10,467,488 to Roberto Sicconi et al. describes a method to analyze attention margin and prevent inattentive and unsafe driving. Using a driver-facing camera, a computer device receives extracted features reflecting the driver's behavior including head and eye movement, speech and gestures. The driver's attention and emotional state is determined to evaluate risks associated with the moving vehicle. Among other things, the reference describes a method of analysis of eye gaze tracking points to predict a level of driver alertness, including distinguishing between fixations caused by high interest vs. caused by drowsiness.

U.S. Pat. No. 10,293,768 to Wellen Sham describes a system that can be configured to play a song when a fatigue condition is detected as an alert to the operator. For example, the system may include a rule that specifies the entertainment system should be activated to play a specific song when a fatigue condition is detected for the operator. U.S. Pat. No. 9,139,087 to Jordon Tuzsuzov describes a method for monitoring the alertness of a driver, including continuously detecting and evaluating at least one physical parameter of the driver and transmitting a periodic audio signal if the evaluated physical parameter is in a critical range. The periodic audio signal may be transmitted for a period of time to reliably prevent a driver from falling asleep.

Methods have been proposed to monitor a driver's driving behaviors. U.S. 2017/0282792 to Herve Illy describes a system that detects a lack of vigilance by a driver. When the vigilance of the driver becomes less than a vigilance threshold, a sound is generated for a sound source.

Specialized sound sources have been found to increase driver concentration. Tuzsuzov indicates that a frequency of a transmitted periodic audio signal is in a frequency range between 12 hertz and 15 hertz and thus in a frequency range of alpha and beta waves of a human brain. Thus, the transmitted periodic audio signal enables a stimulation of the brain waves of the driver such that the concentration of the driver can be increased. In a preferred embodiment, the transmitted periodic audio signal is superimposed with further audio signals.

However, there is still a need for a system and method of affectively handling cognitive tunneling. There is a need for a system and method of distinguishing between attentional states so that an appropriate response can be provided. There is a need for a system and method of accurately distinguishing between fatigue and cognitive tunneling, and providing a response that is most effective for the state of the driver.

An aspect is a system that can learn to recognize a cognitive tunneling state versus a fatigue state. An aspect is a system that can learn one or more appropriate auditory cues provided to a driver by monitoring physiological responses to the auditory cues such as hand and head movements, voice and radio volume, body motion, and heart rate. An aspect is a system that can learn which auditory cue(s) most quickly mitigates a cognitive tunneling state. An aspect is accurate discrimination between fatigue and cognitive tunneling using heart rate variability (HRV) in com-

SUMMARY

An aspect is a driver monitor system for mitigating cognitive tunneling in a vehicle, the system including at least one in-cabin video camera; a heart rate monitor; an audio-visual device; and processing circuitry configured to detect eye gaze direction, eye lid position, and head position using images from the at least one in-cabin video camera, measure heart rate variability using the heart rate monitor, using the eye gaze direction, eye lid position, head position, and heart rate variability to predict whether a driver is transitioning into a cognitive tunneling state or a fatigue state, and output to the audio-visual device one audio-visual cue to mitigate the cognitive tunneling state and output a different cue to mitigate the fatigue state.

An aspect is a method mitigating cognitive tunneling in a vehicle with a driver monitor system. The system includes at least one in-cabin video camera, a heart rate monitor, an audio-visual device, and processing circuitry. The method includes detecting, by the processing circuitry, eye gaze direction, eye lid position, and head position using images from the at least one in-cabin video camera; measuring, by the processing circuitry, heart rate variability using the heart rate monitor; using the eye gaze direction, eye lid position, head position, and heart rate variability to predict, by the processing circuitry, whether a driver is transitioning into a cognitive tunneling state or a fatigue state; and outputting to the audio-visual device one audio-visual cue to mitigate the cognitive tunneling state and outputting a different cue to mitigate the fatigue state.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a technique that discerns between different attentional states and applies the most appropriate stimulus to mitigate the attentional state. The technique distinguishes between cognitive tunneling and driver fatigue which have different physiological traits. The system utilizes vehicle sensors (e.g., cameras, blood pressure, heart rate, body temperature, etc.) and machine learning to determine if the driver is tunneling, fatigued, or neither.

Figure 1:
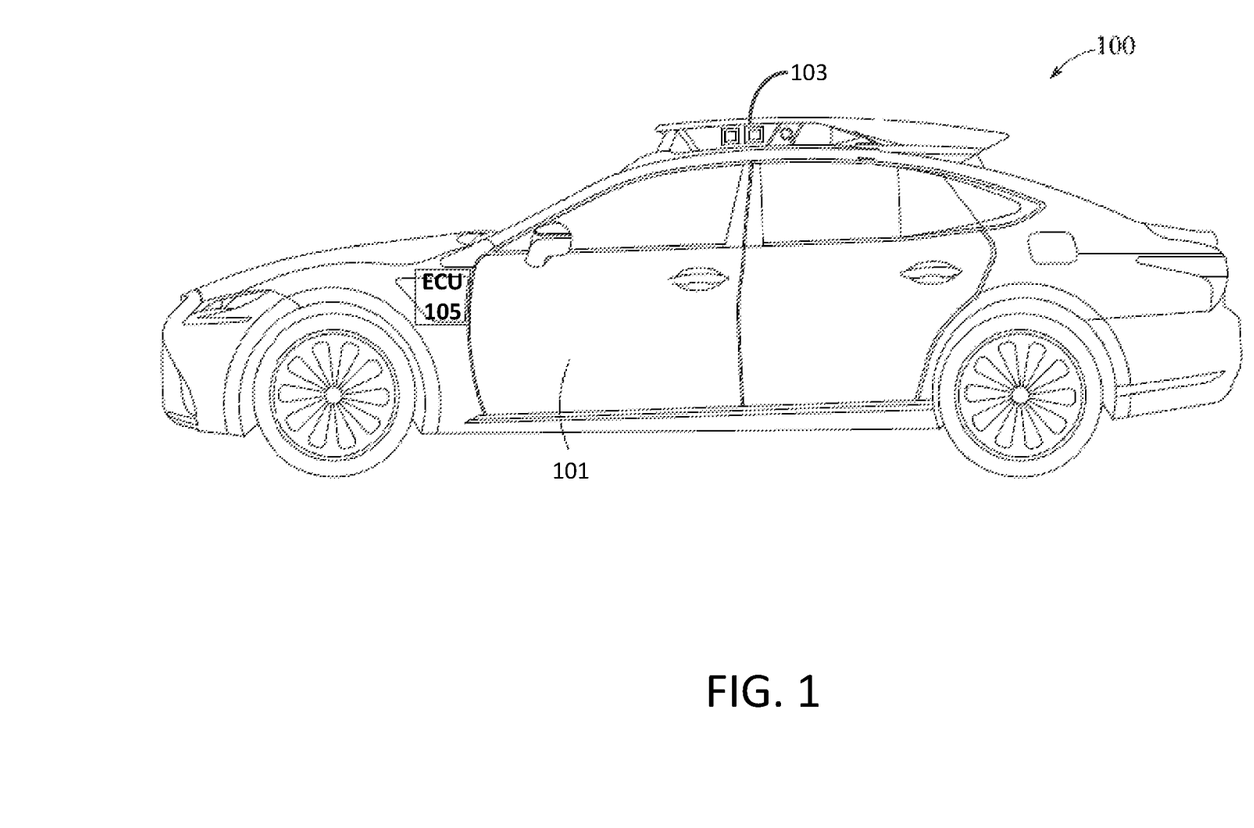
FIG. 1 illustrates a vehicle having an array of exterior sensors.

FIG. 1 illustrates a passenger vehicle having an array of exterior sensors, such as those that may be found in a range of passenger vehicles ranging from those equipped with advanced driver-assist features to those equipped as a fully automated self-driving vehicle.

Referring to FIG. 1, a vehicle 100 includes an array of sensors 103 and a controller, ECU 105. Sensors may be mounted on a roof of a vehicle, mounted on the vehicle body 101, and may be included within the body of a passenger vehicle, or a combination thereof. The types of sensors that may be mounted on an exterior of a vehicle may include radar, LiDAR, video cameras, and sonar antennas. Video cameras, radar antennas, and sonar antennas may be located around a periphery of the vehicle. In particular, the passenger vehicle may be fitted with forward-looking cameras, as well as other front-mounted sensors to detect other vehicles, pedestrians, and obstacles, or to determine traffic conditions, such as intersections and merging traffic lanes, in the vehicle's vicinity. The combination of sensors may be used to assist drivers in choosing the safest routes possible, or may provide information needed for operation of an autonomous vehicle. In particular, a passenger vehicle 100 may include other sensors for advanced control and navigation, including GPS, odometry and inertial measurement units.

A passenger vehicle 100 may include internal sensors for monitoring various conditions of the vehicle, such as steering angle and vehicle speed. The steering angle may be used to track the amount that a vehicle is turning.

Figure 2:
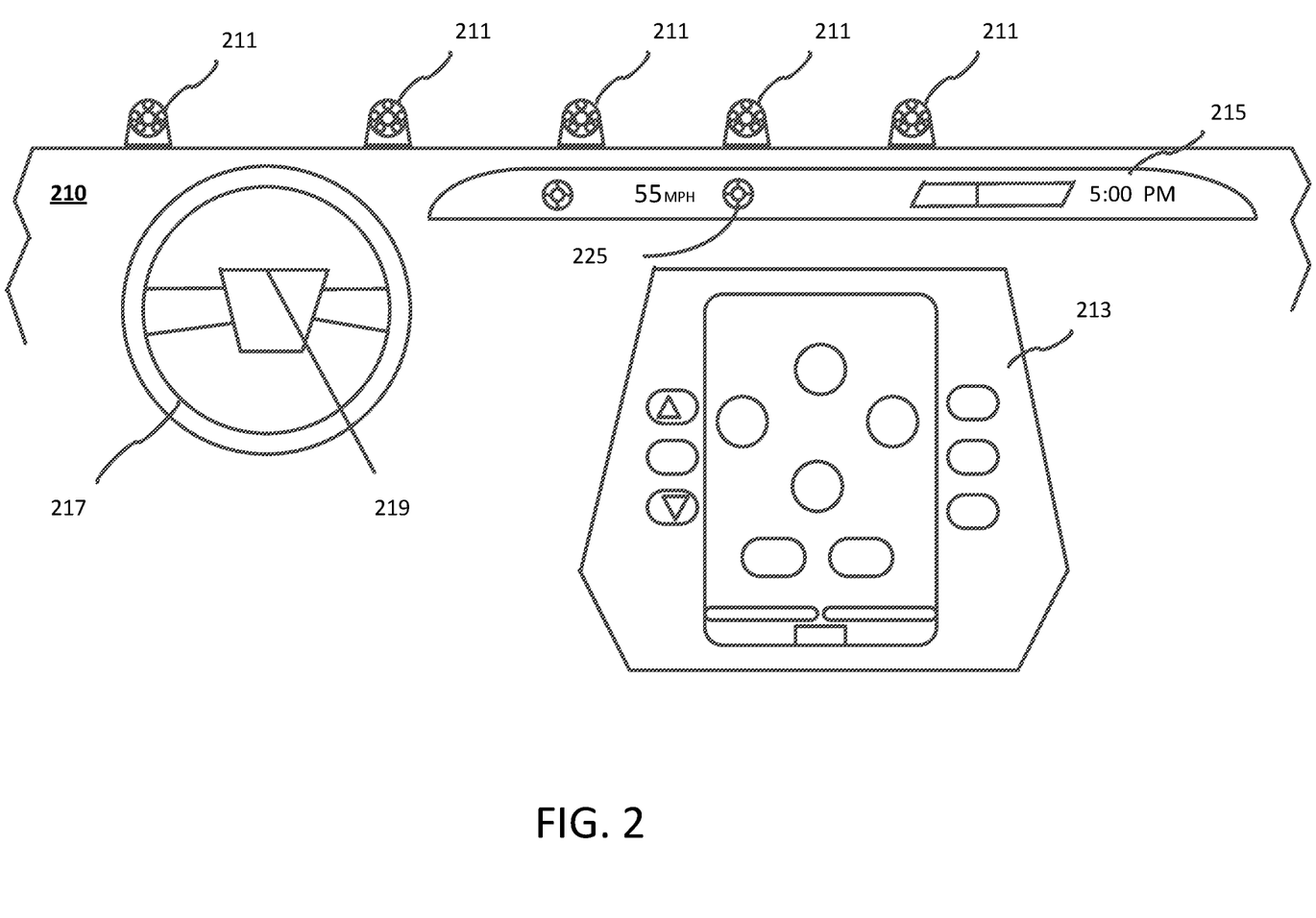
FIG. 2 illustrates sensor and displays for an interior of a vehicle in accordance with an exemplary aspect of the disclosure.

FIG. 2 illustrates sensor and displays for an interior of a vehicle in accordance with an exemplary aspect of the disclosure. In addition to an instrument panel 215, which may include at least a speedometer 225 to measure and display a speed of a vehicle, a vehicle 100 may include a navigation, or infotainment, interactive display 213. The interior cabin of the vehicle may include one or more in-cabin cameras 211. In-cabin cameras 211 may be mounted on a vehicle dashboard 210, along the ceiling, embedded in the dash, in the rear-view mirror, or even in the steering wheel 217 or on the steering column. A digital instrument panel 215 may be included above the navigation display in a vicinity of the center of the dashboard 210.

The driver monitor cameras 211 may capture video images for different functions. At least two driver monitor cameras 211 may capture images of the driver's face and/or head. At least one driver monitor camera 211 may capture images of the driver's body posture while seated. At least one driver monitor camera 211 may be part of an eye tracking system.

Figure 3:
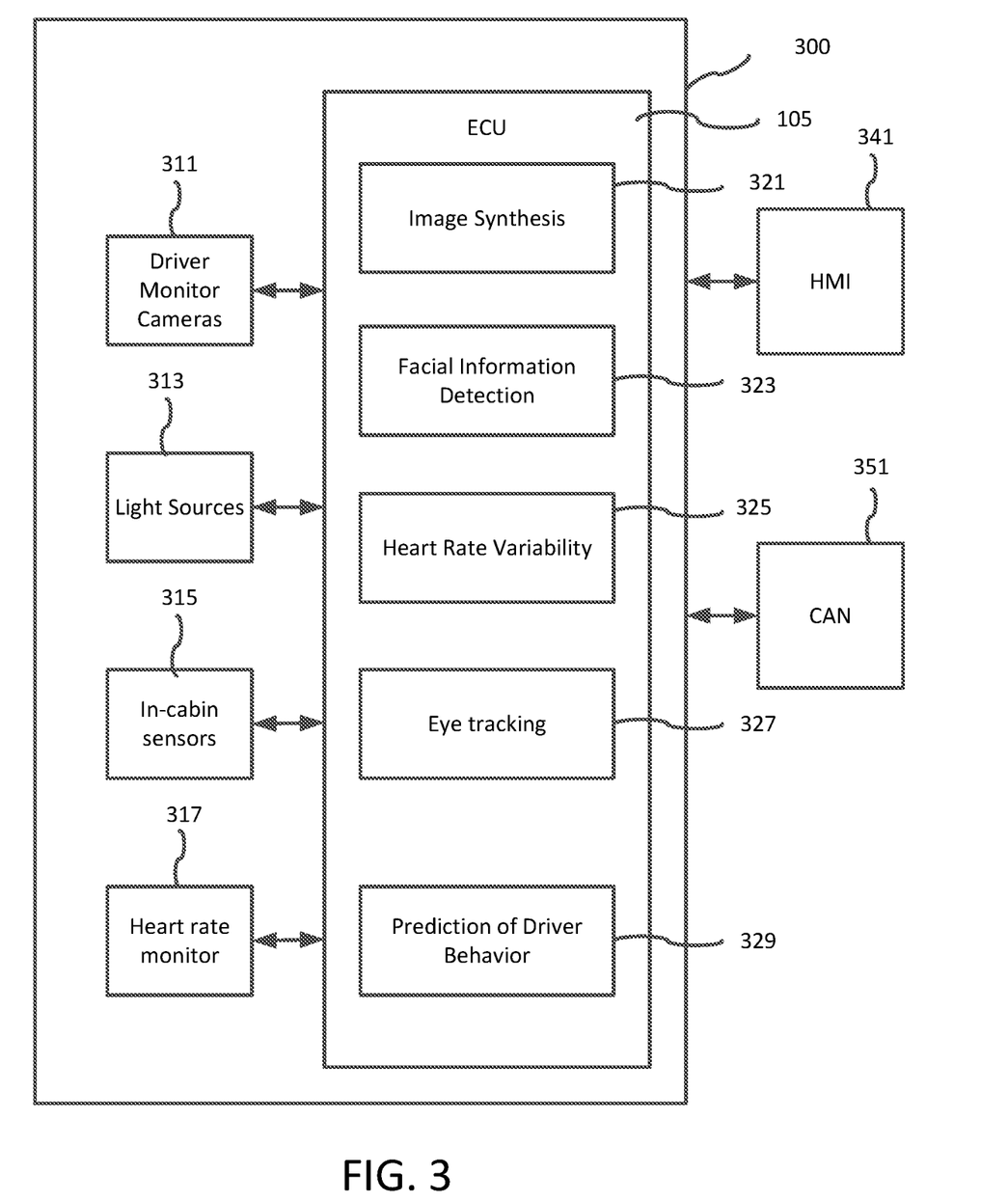
FIG. 3 is a block diagram of driver monitor system in accordance with an exemplary aspect of the disclosure.

FIG. 3 is a block diagram of driver monitor system in accordance with an exemplary aspect of the disclosure. Driver monitor systems may be included in various types of vehicles to enhance safety. Passenger vehicles may be driven by drivers that may not have had sufficient sleep or are driving for long periods of time. In a similar manner, trucks may be driven by truck drivers for extended periods of time. Truck driver safety is a concern when the truck driver does not get sufficient rest. Delivery trucks may be faced with driving in heavy traffic conditions and into neighborhoods or congested areas requiring utmost alertness. Thus, driver monitor systems include sensors, such as in-vehicle cameras, to monitor a driver's face, a driver's head position, track the driver's eye movement, the driver's posture in a seat, even other physical state conditions such as heart rate and facial blood flow. The driver monitor systems may include sensors to monitor the vehicle state, such as motion of the steering wheel and position of the vehicle relative to the road. To avoid driver distraction, the lighting for in-vehicle cameras may be infrared lighting.

Regarding FIG. 3, the driver monitor system 300 may include one or more driver monitor cameras 211 and associated light sources 313. The driver monitor cameras 211 and light sources 313 may be located at various positions in the cabin interior. The driver monitor cameras 211 may capture video images for different functions. At least two driver monitor cameras 211 may capture images of the driver's face and/or head. At least one driver monitor camera 211 may capture images of the driver's body posture while seated. At least one driver monitor camera 211 may be part of an eye tracking system.

The driver monitor system 300 may include other in-cabin sensors 315 for detecting the state of the driver or condition of the cabin environment, such as one or more touch free thermometers. The driver monitor system 300 may include a heart rate monitor 317. The heart rate monitor 317 may be a device worn by a driver, such as a smartwatch that includes a heart rate monitoring function. The heart rate monitor 317 may include sensors built into the vehicle, such as heart rate sensors positioned around the perimeter of a steering wheel. The heart rate monitor 317 may be a camera that monitors blood flow to the driver's face. The heart rate monitor 317 may include an operation to store a heart rate profile in a memory.

The driver monitor system 300 may include at least one electronic control unit (ECU) 105. The electronic control unit 105 may perform various functions using data received from the sensors 211, 315, 317. An image synthesis function 321 may combine images received from one or more driver monitor cameras 211. The image synthesis function 321 may combine images to form a single synthesized image without overlap. Alternatively, the image synthesis function 321 may combine two or more images to form a three dimensional image. The three dimensional image may be of a driver's face, or of a driver's head.

A facial information detection function 323 may use one or more images received from driver monitor cameras 211 and detect features of the driver's face including eyes, nose, mouth, and possibly ears. Detected facial features may include the position of the eyes, nose and mouth, and whether both ears are visible. Detected features may include whether the driver's mouth is moving, such that the driver is yawning or speaking. A detection that the driver is yawning may be an indication of driver fatigue. A detection that the driver is speaking may be an indication that the driver may not be focused on driving. The facial information detection function 323 may use facial features to determine the position and/or movement of the driver's head. A position of a driver's head that is determined to be drooping, or a movement of the driver's head that is falling/lowering may be an indication of driver fatigue. A driver's head movement may also be an indication that the driver is changing eye gaze direction.

The heartrate monitor 317 is a sensor that provides a signal that represents a driver's heart rate. Examples of heart rate monitors include an in-cabin camera that detects facial blood flow, a heart rate monitor mounted in the steering wheel, a smartwatch, or even a smartphone that receives heart rate information. A heart rate monitor may use optical technology, which sends light into the person's skin and reads the light coming back in to track pulse. A pulse oximeter detects pulse by illuminating the skin with light from a light-emitting diode and then measuring the amount of light reflected to a photodiode as a photoplethysmographic (PPG) signal. Other heart rate monitors measure heart rate with a transmitter that detects electrical activity.

A heart rate variability function 325 may receive the heart rate signal and perform an analysis to determine variability of the heart rate signal. Heart rate variability (HRV) is the physiological phenomenon of variation in the time interval between heartbeats. It is measured by the variation in the beat-to-beat interval. HRV may be measured by obtaining a continuous heart rate signal, or by acquiring the PPG signal. Among methods of analyzing heart rate variability are time domain methods or frequency-domain methods. Frequency domain methods assign bands of frequency and then count the number of intervals between normal beats (NN) that match each band. The bands are typically high frequency (HF) from 0.15 to 0.4 Hz, low frequency (LF) from 0.04 to 0.15 Hz, and the very low frequency (VLF) from 0.0033 to 0.04 Hz.

An eye tracking function 327 measures either the point of gaze (where one is looking) or the motion of an eye relative to the head. An eye tracking function may be performed by an eye tracker which is a device for measuring eye positions and eye movement. Video-based eye trackers typically use the corneal reflection (the first Purkinje image) and the center of the pupil as features to track over time.

The point of gaze, or eye gaze direction, may be monitored to determine if eye gaze is fixed on a point of high interest for an exceptional period of time. When the point of interest is outside the field of view of the windshield while the vehicle is moving, or is directed to an object or display device inside the vehicle, such a point of gaze may be an indication of cognitive tunneling. When the point of interest is outside the field of view of the windshield while the vehicle is moving, but is erratic, such eye gaze behavior may be an indication of driver fatigue.

Provided facial information from the facial information detection function 323, heart rate variability, eye gaze direction and eye gaze movement, state of the eye lid, head position and movement, body position, a driver behavior prediction function 329 may be used to predict whether a driver is getting tired or may be transitioning to a cognitive tunneling state. As will be discussed further below, driver behavior prediction may be implemented using a machine learning technique.

It has been determined that heart rate variability (HRV) is lower than a resting state when a person is in a cognitive tunneling state. The heart rate variability function 325 may be used to differentiate a cognitive tunneling state from a fatigued state based off of heart rate. A fatigued state will likely have a slower heartbeat compared to baseline/norm. A cognitive tunneling state may be characterized by a low HRV.

The eye tracking function 327 may be configured to measure PERCLOS, which is a measure of the percent of eyelid closure. A PERCLOS measurement may also be used to distinguish a fatigue state from a cognitive tunneling state. A cognitive tunneling state may have a low PERCLOS, while a fatigued state will generally have a higher PERCLOS (drooping eyelids). To measure PERCLOS, the eye tracking function 327 may be implemented with a high definition video camera 211.

The eye tracking function 327 may also be configured to perform various other measurements including pupil dilation, saccade, and gaze eccentricity. Saccades serve as a mechanism for fixation, rapid eye movement. When scanning immediate surroundings or reading, human eyes make saccadic movements and stop several times, moving very quickly between each stop. Human eyes move around, locating interesting parts of a scene and building up a mental, three-dimensional map corresponding to the scene. Measurements of saccade may include saccade velocity, acceleration, and frequency.

The eye tracking function 327 may be configured to perform measurements of eye gaze eccentricity, which is a deviation in the driver's gaze. Measurements may also include duration of eye gaze in one direction.

A driver monitor camera may also be configured to differentiate a cognitive tunneling state from a fatigued state by its ability to recognize yawning and other facial traits associated with sleepiness, such as eyebrow furrowing.

Lateral movement of a steering wheel may also be used to distinguish driver fatigue state from cognitive tunneling. Measurements of steering wheel movement may include steering entropy; steering wheel velocity and acceleration, and steering wheel reversal frequency. When a driver is in a tunneling state, the steering wheel may be unusually fixated despite variations in the road direction. When a driver is in a fatigue state, movements of the steering wheel may be unusually larger than normal with periods of limited adjustment in between.

A human machine interface (HMI) 341 may include devices for visual and audio outputs.

A controller area network (CAN) 351 is a network that allows controllers and devices in a vehicle to communicate with each other without a host computer. Among other things, a CAN 351 may provide information about the performance of a vehicle, such as the wheel angle, vehicle speed and acceleration.

Figure 4:
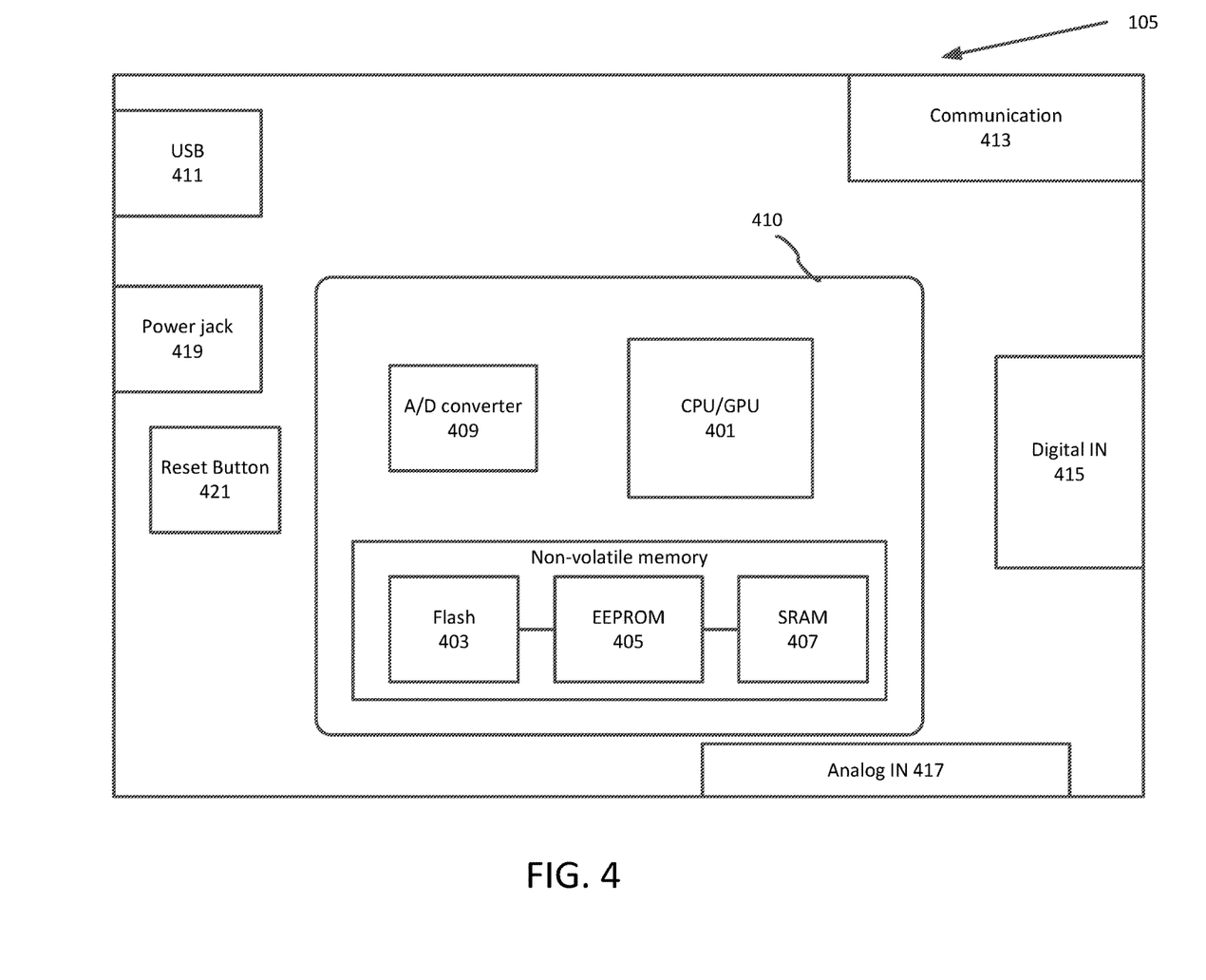
FIG. 4 is a block diagram of an electronic control unit in accordance with an exemplary aspect of the disclosure.

FIG. 4 is a block diagram of an electronic control unit in accordance with an exemplary aspect of the disclosure. The electronic control unit 105 may be based on a microcontroller. A microcontroller includes processing circuitry that may contain one or more processor cores (CPUs) along with memory (volatile and non-volatile) and programmable input/output peripherals. Program memory in the form of flash, ROM, EPROM, or EEPROM is typically included on chip, as well as a secondary RAM for data storage. In one embodiment, the electronic control unit 105 is an integrated circuit board with a microcontroller 410. The board includes digital I/O pins 415, analog inputs 417, hardware serial ports 413, a USB connection 411, a power jack 419, and a reset button 421. Other microcontroller configurations are possible. Variations can include the number of pins, whether or not the board includes communication ports or a reset button.

In an exemplary embodiment, the microcontroller may be a RISC-based microcontroller having flash memory 403, SRAM 407, EEPROM 405, general purpose I/O lines, general purpose registers, a real time counter, six flexible timer/counters, a A/D converter 409, and a JTAG interface for on-chip debugging. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

Figure 5:
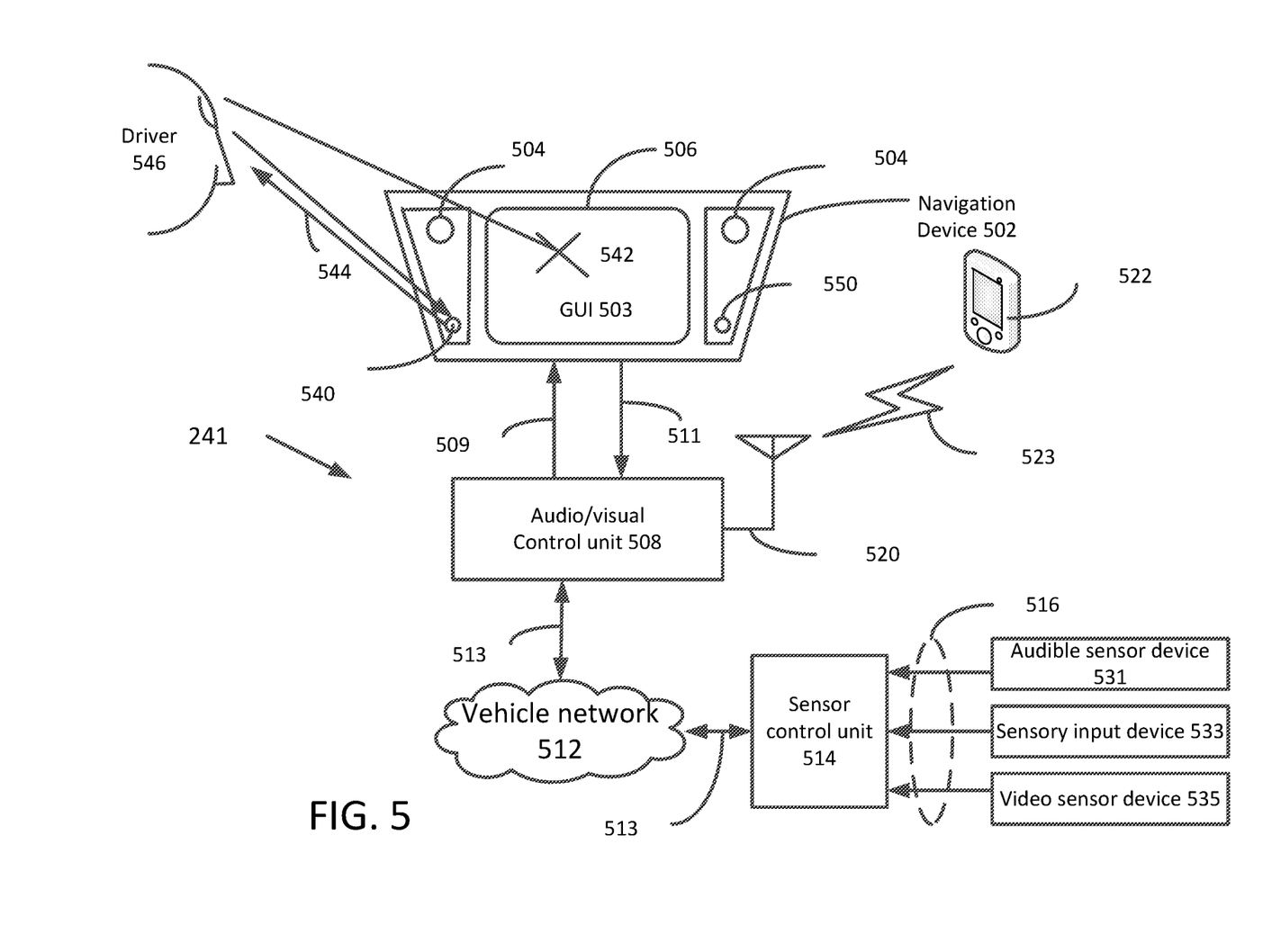
FIG. 5 is a schematic diagram of a human computer interface in accordance with an exemplary aspect of the disclosure.

FIG. 5 is a schematic diagram of a human machine interface in accordance with an exemplary aspect of the disclosure. While the human machine interface 341 is depicted in abstract with other vehicular components, the human machine interface 341 may be integrated with other system components of the vehicle 100 (see FIG. 1).

As shown in the example of FIG. 5, a vehicle navigation device 502 communicates through audio/visual control unit 508, which communicates with a sensor control unit 514 over a communication path 513 via vehicle network cloud 512.

As may be appreciated, the communication path 513 of the vehicle network 512 may be formed of a medium suitable for transmitting a signal such as, for example, conductive wires, conductive traces, optical waveguides, or the like. Moreover, the communication path 513 can be formed from a combination of mediums capable of transmitting signals. In one embodiment, the communication path 513 can comprise a combination of conductive traces, conductive wires, connectors, and buses that cooperate to permit the transmission of electrical data signals to components such as processors, memories, sensors, input devices, output devices, and communication devices. Accordingly, the communication path 513 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The sensor control unit 514 receives sensor data 516 from the audible sensor device 531, sensory input device 533, and video sensor device 535. For further example, the sensor data 516 operates to permit object detection external to the vehicle, such as other vehicles (including vehicles occupying a parking location), roadway obstacles, traffic signals, signs, trees, etc. The sensor data 516 allows the vehicle 100 (see FIG. 1) to assess its environment in order to maximize safety for vehicle passengers and objects and/or people in the environment. The sensor data 516 also provides information relating to a moving target, and to provide moving target indication (MTI) data.

As an example, the sensory input device 533 provides tactile or relational changes in the ambient conditions of the vehicle, such as an approaching person, object, vehicle, etc. The one or more of the sensory input devices 304 can be configured to capture changes in velocity, acceleration, and/or distance to objects relative to the travel of the vehicle 100, as well as an angle of approach. The sensory input devices 533 may be provided by a Light Detection and Ranging (LIDAR) system and/or milliwave radar devices. As an example, the sensory input devices 533 may identify objects in the roadway (such as other vehicle, debris, etc.), and may identify moving objects adjacent to the roadway that may present a hazard to the vehicle 100 (such as animals and/or debris coming within the roadway).

Sensor data 516 relating to the video sensor devices 211 (see FIG. 2) operate to capture still-frame of and/or video images within associated fields of view for display to the touch screen 506 of the vehicle navigation device 502.

The audio/visual control unit 508 receives the sensor data 516 via the communication path 513 and vehicle network 512, and produces display data 509 for display by the touch screen 506. The audio/visual control unit 508 also receives user input data 511 from the vehicle navigation device 502, which may be from the tactile input 504, microphone 550, eye-tracking input device 540, etc.

The audio/visual control unit 508 may include an antenna 520 for wireless communications 523 with user devices, such as a handheld mobile device 522.

The handheld mobile device 522, by way of example, may be a device including hardware (for example, chipsets, processors, memory, etc.) for communicatively coupling with a network cloud and/or directly with the audio/visual control unit 508 via the antenna 520, and also includes an antenna for such wireless communication.

The antenna 520 may include one or more conductive elements that interact with electromagnetic signals transmitted by global positioning system satellites. The received signals may be transformed into a data signal indicative of the location (for example, latitude and longitude positions), and further indicative of the positioning of the device 522 with respect a vehicle position, that can be indicated on a map displayed via the touch screen 506, or otherwise displayed via the vehicle GUI 503.

The wireless communications 523 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, Bluetooth low energy, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

The vehicle navigation device 502 includes, for example, tactile input 504, a touch screen 506, microphone 550, and eye-tracking input device 540. The touch screen 506 operates to provide visual output or graphic user interfaces such as, for example, maps, navigation, entertainment, information, infotainment, and/or combinations thereof.

The touch screen 506 may include mediums capable of transmitting an optical and/or visual output such as, for example, a cathode ray tube, light emitting diodes, a liquid crystal display, a plasma display, etc. Moreover, the touch screen 506 may, in addition to providing visual information, detect the presence and location of a tactile input upon a surface of or adjacent to the display. Accordingly, the display may receive mechanical input directly upon the visual output provided by the touch screen 506. Additionally, it is noted that the touch screen 506 can include at least one or more processors and one or more memory modules.

The vehicle navigation device 502 may also include tactile input and/or control inputs such that the communication path 513 communicatively couples the tactile input to other control units and/or modules of the vehicle 100 (see FIG. 1). The tactile input data may be provided by devices capable of transforming mechanical, optical, or electrical signals into a data signal capable of being transmitted via the communication path 513.

The tactile input 504 may include a number of movable objects that each transform physical motion into a data signal that can be transmitted over the communication path 513 such as, for example, a button, a switch, a knob, etc.

The touch screen 506 and the tactile input 504 may be combined as a single module, and may operate as an audio head unit or an infotainment system of the vehicle 100. The touch screen 506 and the tactile input 504 can be separate from one another and operate as a single module by exchanging signals.

Touch screen 506 may include a display screen, such as a liquid crystal display (LCD), light emitting diode (LED), plasma display or other two dimensional or three dimensional display that displays graphics, text or video in either monochrome or color in response to display data 509.

A built-in eye-tracking input device 540 includes a near-infrared light transmitter that projects a pattern of tracking signals 544 onto the eyes of the user 546. The built-in eye-tracking input device 540 also includes a camera operable to take high-frame-rate images via the tracking signals 544 of the user's eyes and the reflected patterns. In this manner, the built-in eye-tracking input device 540 operates to determine a gaze point 542 of the touch screen 506. As with a physical touch of the touch screen 506, the gaze point 542 may be used as a user input, which is provided as user input data 511 to the audio/visual control unit 508.

Machine Learning

Machine learning may be used to predict whether a driver is moving into a fatigue state, a cognitive tunneling state, or neither. The machine learning model may be made off line using a supervised learning algorithm, such as a Support Vector Machine (SVM) or regression analysis, or may be made by a continuous learning algorithm, such as reinforcement learning.

Figure 6A:
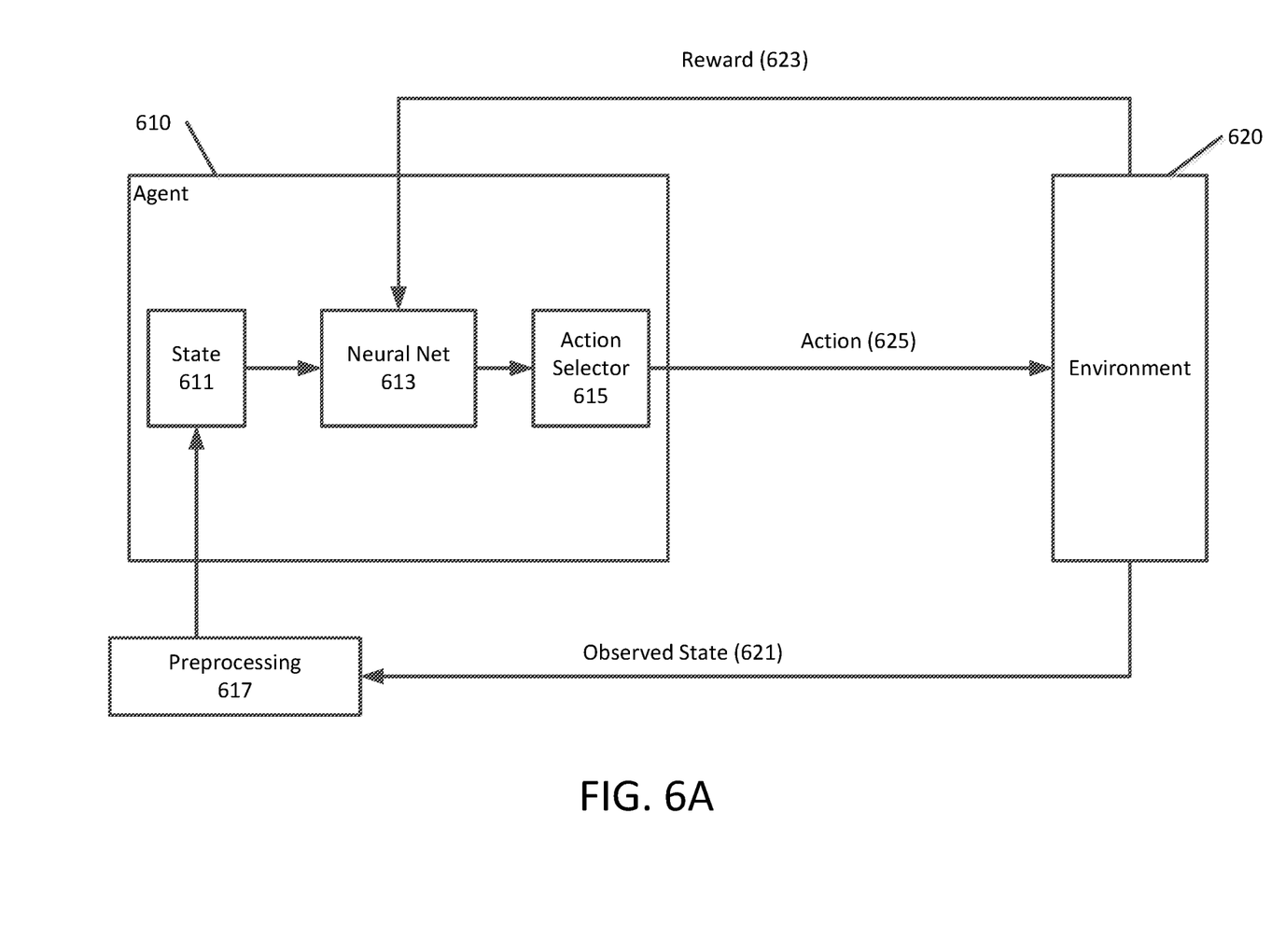
FIGS. 6A, 6B are a block diagram of a reinforcement learning system and an artificial neural network architecture in accordance with an exemplary aspect of the disclosure.
Figure 6B:
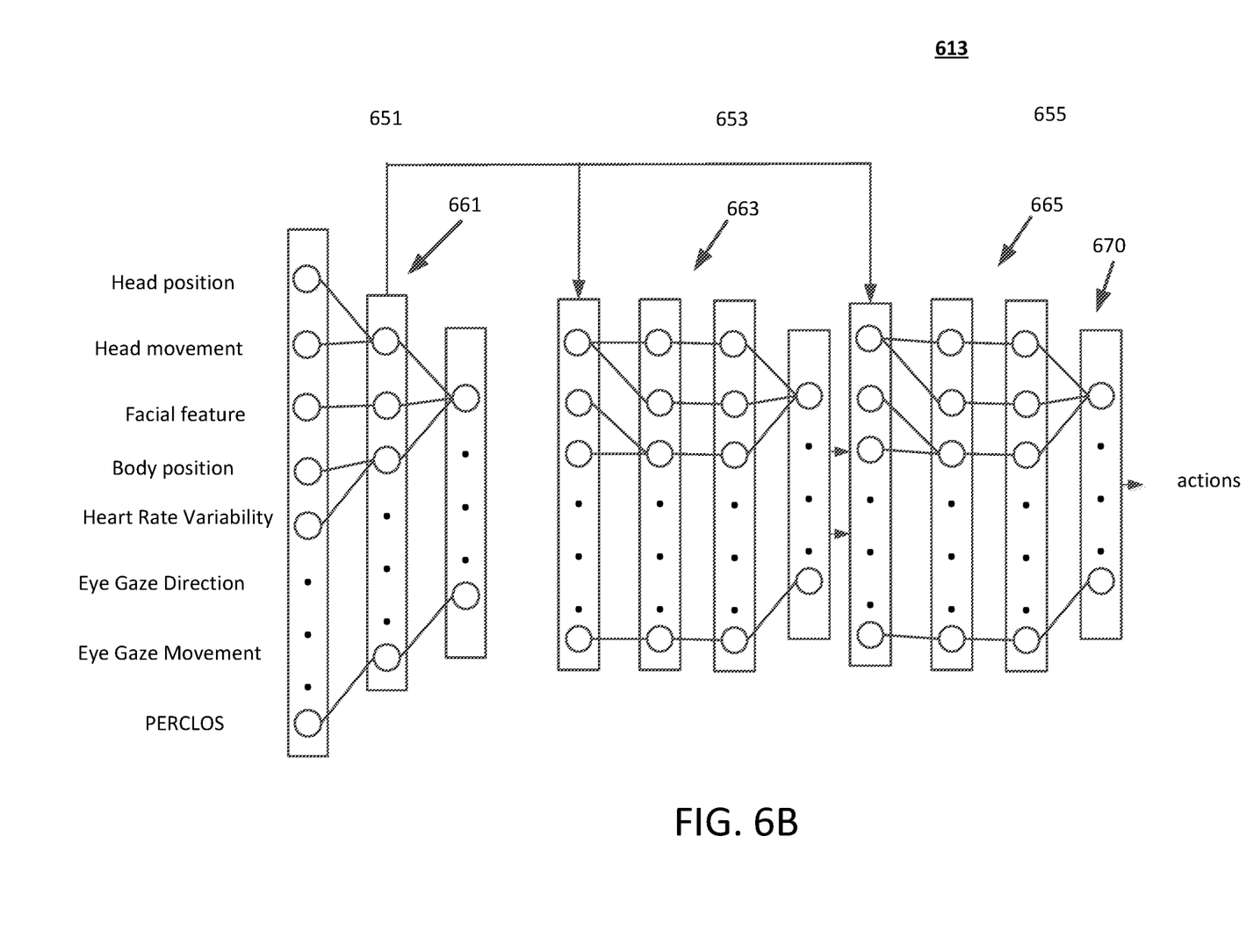

FIG. 6A is a block diagram of a reinforcement learning system in accordance with an exemplary aspect of the disclosure. FIG. 6B is an architecture for the artificial neural network of FIG. 6A.

In reinforcement learning, an agent 610 interacts with an environment 620 in discrete time steps. Learning is performed in an artificial neural network 613. The artificial neural network 613 may be a multi-layered network having at least one hidden layer. The input layer of the network 613 is arranged according to a vector representation of the state 611. The output layer of the network 613 will consist of one neuron for each possible action. At each time t, the agent 610 receives an observation which typically includes the reward. It then chooses 615 an action from the set of available actions (output from the neural network 613), which is subsequently sent to the environment 620. The environment 620 moves to a new state and the reward associated with the transition is determined. The goal of a reinforcement learning agent is to collect as much reward as possible. The agent 610 can (possibly randomly) choose any action as a function of the history.

The driver monitor system 200 may include feedback input from the driver to train a machine learning algorithm.

Reinforcement learning allows for continuous learning and may learn based on the driver feedback. The driver monitor system's 200 sensors (Observed state 621) are fed to the artificial neural network 613 which may detect a state of tunneling or fatigue and output a set of actions. An action selector 615 will select an action 625, such as ask the driver, "Are you thinking about something intently right now?" for tunneling or "Are you feeling sleepy at this moment?" for fatigue. A positive reward 623 (e.g., +1) will be awarded when the answer to the question is Yes. A negative reward 623 (e.g., −1) may be awarded when the answer to the question is No, or Not at all. A lower positive reward (e.g., +0.5) may be awarded when the answer to the question is Somewhat. The driver monitor system 200 may perform preprocessing 617 of sensor data, including quantifying the sensor data. For example, a 3-pt scale may be implemented (1—not at all, 2—somewhat, 3—yes) to help ordinate the sensor data. Also, sensor data such as camera images may undergo preprocessing to extract features such as head downward movement, yawning, a facial blood flow rate. This data 611 is then fed back into the artificial neural network 613 so that the system is able to more effectively and rapidly detect cognitive tunneling or fatigue states for that specific driver and issue an appropriate action.

In some embodiments, the reinforcement learning system may be trained to determine an effective stimulus response (most efficient action 625). The action selector 615 may include a list of songs, a statement in a particular voice, an action of playing discord notes, an action of turning on A/C. The selected action that gives a positive reward 623 may be the most effective stimulus response FIG. 6B is a block diagram of the architecture for the artificial neural network in accordance with an exemplary aspect of the disclosure. The architecture of the artificial neural network 613 may include an encoder 651, and a sequence of N tandem decoders 653, 655. The encoder 651 is a shallow artificial neural network with one hidden layer 661. The encoder 651 generates vector representations of the input driver state. In one embodiment, after training the encoder 651, the hidden layer 661 represents the vector representation for the driver state. Each decoder 653, 655 is a multilayer artificial neural network, each having at least two hidden layers 663, 665, i.e., is a deep learning neural network. Although FIG. 6B shows three artificial neural networks arranged as tandem decoders, the number of decoders may be different depending on desired accuracy and training time. A decoder 653 takes the vector representations as inputs and outputs the driver class (cognitive tunneling, driver fatigue, other). During training, a subsequent decoder 655 takes the vector representations as inputs and uses the outputs of the upstream decoder 653 as targets. This method of training is performed in other downstream decoders in sequence. Each decoder 653, 655 may be an artificial neural network architecture that is trained using the backpropagation algorithm. An output layer 670 of the last decoder outputs the actions based on a detected driver class.

Each driver of the vehicle may have his/her profile for tunneling vs fatigue states. The profile for a driver may include a resting HRV. A low HRV may be defined as an HRV that is below the resting HRV. A high HRV may be defined as an HRV that is above the resting HRV. This profile can be stored in a cloud-based database and accessed by any vehicle with the tunneling/fatigue mitigation device.

As an alternative to reinforcement learning, a machine learning model may be determined using the driver profile and Support Vector Machines (SVM). A SVM is a binary classifier, meaning it classifies data samples into one of two classes. In the case of classifying a driver of being in a cognitive tunneling state, fatigue state, or some other state, the classification requires classifying the data into three or more classes, a problem referred to as multiclass classification. One strategy to solving the multiclass classification problem using binary classifiers is to train a single classifier for each class, known as one-vs-rest strategy. In the one-vs-rest strategy, each classifier produces a real-valued confidence score for its classification decision. The classifier having the highest confidence score is the likely class for the data. The SVM may include a system of binary classifiers, where one classifier determines if the driver is in a cognitive tunneling state, or another state, a second classifier determines if the driver is in a fatigue state, or another state, and a third classifier determines if the driver is in another state. The classifier having the highest confidence score represents the likely driver state.

Sensor data for a driver state 611 may include: head position (Yaw, Pitch), head motion (head droop, head falling down), facial features (stationary, yawning); body posture in seat (proper, slouched); heart rate variability (high, low, resting); eye gaze direction (straight ahead, left, right, down), eye movement (steady, moving, or a rate based on velocity, acceleration), and PERCLOS (percentage).

At a higher level, a driver state 611 may be characterized by 1) driver performance, 2) driver behavior, and 3) driver physiology. Driver performance characteristics may include typical operation of the vehicle, such as typical steering wheel movement rate, vehicle acceleration, vehicle braking, and driver's focus on road ahead, relative to road and traffic conditions. Driver behavior characteristics may include eye focus direction and duration in each direction, heart rate variability, and facial features (e.g., yawning). Driver physiology characteristics may include body posture, head position, head movement.

Appropriate Stimulus

The actions 625 that may be selected by the agent 610 may include a stimulus to mitigate a fatigue condition or a cognitive tunneling condition.

Research has shown that eliciting emotional responses in the brain may mitigate a cognitive tunneling state. For example, emotional responses can be triggered by applying auditory cues such as a favorite song, hearing the voice of a family member or a friend, and hearing one's voice. Subsequently, when the agent 610 detects a cognitive tunneling state, the driver monitor system 200 can play back a previously recorded favorite song or a particular voice track, for example, through speakers located near the driver's head, to elicit an emotional response and bring the driver out of the tunneling state. In some embodiments, the driver monitor system 200 can pre-record voice tracks of the driver and other passengers, and store the tracks in a database to be used as auditory cues.

In some embodiments, the Agent 610 can learn one or more favorite songs of a driver by, e.g., monitoring physiological responses while songs are playing, such as hand and head movements, voice and radio volume, body motion, heart rate, etc. Positive responses may be fed back as a positive score 623. The agent 610 may learn which auditory cue(s) most quickly mitigates the cognitive tunneling state. Alternatively, the driver can manually enter favorite song titles/artists into the driver monitor system via, e.g., a touch display 506, smartphone 522 synchronized with the system, etc.

As an alternative embodiment, the Agent 610 may play a note at a specific frequency in one ear through a speaker proximate that ear, and simultaneously play a note at a slightly different frequency through a speaker proximate the other ear to create an auditory discord in the brain. Since the brain dislikes this scenario, the auditory discord may bring the driver out of the tunneling state.

The Agent 610 may detect a fatigue state. Eliciting emotional responses is not necessarily an effective tool for mitigating a fatigued state. Other methods may be used to "wake up" a fatigued driver once a fatigued state is detected. For example, haptic vibrations of the steering wheel and/or driver's seat, light braking of the vehicle, increasing the HVAC interior airspeed/temperature, may be used to mitigate a driver fatigue state.

Figure 7:
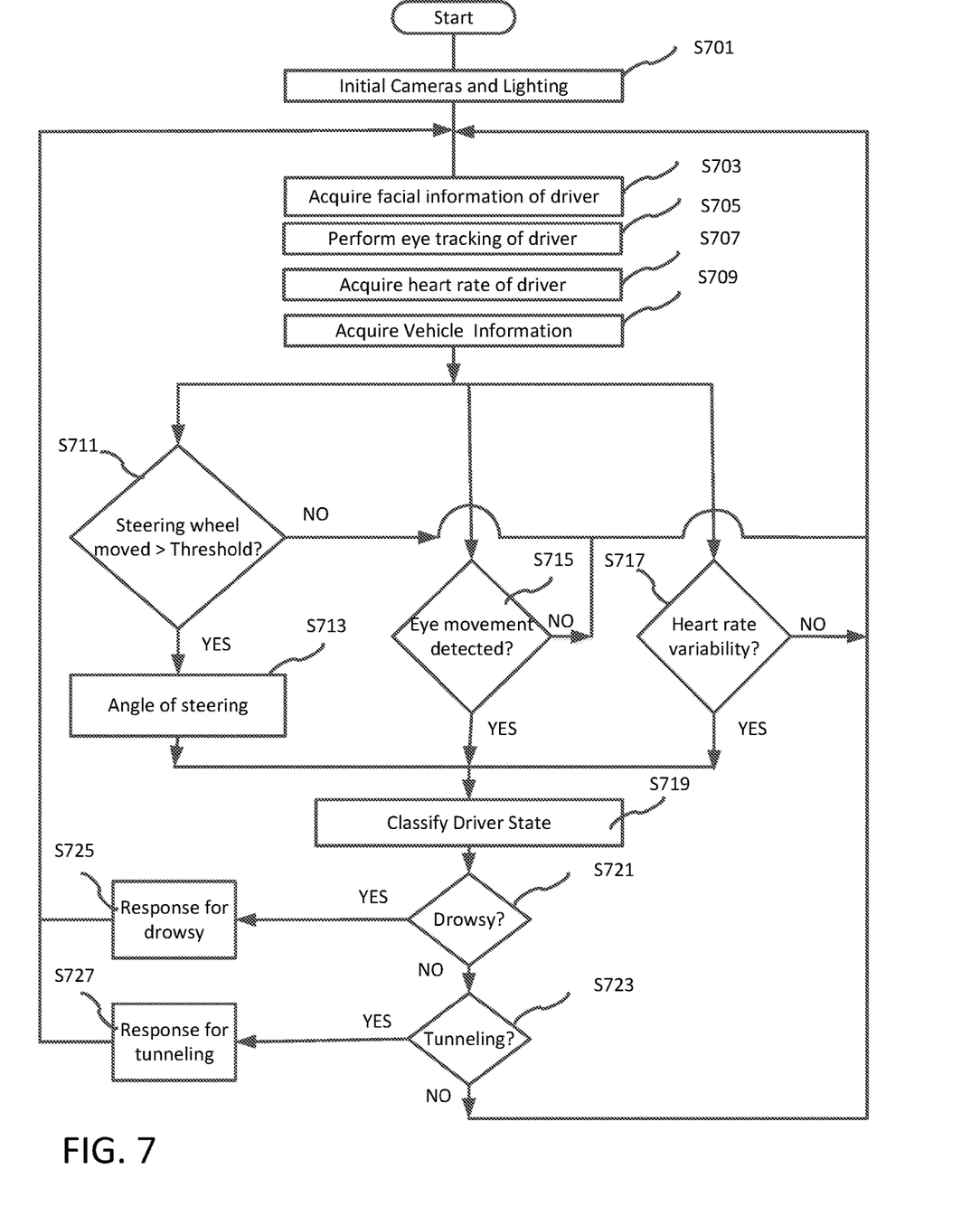
FIG. 7 is a flowchart of a method of driver monitoring in accordance with an exemplary aspect of the disclosure.

FIG. 7 is a flowchart of a method of driver monitoring in accordance with an exemplary aspect of the disclosure. A driver monitor system may be initially set up off line for a driver or drivers of a vehicle. The driver or drivers may enter into a user interface information about the driver, which may include creating a driver behavior profile. The driver behavior profile may include a favorite song, a preferred tone or voice to be played, or a preferred method to bring the driver out of a cognitive tunneling state.

When a driver enters a vehicle and sits in the driver's seat, in S701, the ECU 105 may turn on certain sensors, including heart rate monitor sensors 317, initial driver monitor cameras 211 and light sources 313. In some embodiments, initial sensors 211, 315, 317 and light sources 313 may be turned on when the engine is started. In some embodiments, all interior cabin sensors may be turned on. In some embodiments, only a subset of driver monitor cameras 211 and light sources 313 may be turned on.

In S703, the initial driver monitor cameras 211 and light sources 313 are used to acquire facial information of a driver. The driver's face may not be facing forward or may not be facing toward the initial driver monitor cameras 211. Additional or alternative driver monitor cameras 211 may be turned on in order to obtain an image of the driver's face. In addition to obtaining an image of a driver's face, particular features may be monitored such as facial blood flow, head position, body position, and yawning.

In S705, at least one driver monitor camera 211 may be used for eye tracking of the driver. As mentioned above, eye tracking may include functions of monitoring eye movement and eye gaze direction, and in particular, saccade velocity, acceleration, and frequency, and duration of eye gaze.

In S707, heart rate sensors may be used to measure the heart rate of the driver and in turn the heart rate information may be used to determine a heart rate variability pattern. The heart rate information of a driver may be stored in a driver profile. The heart rate variability pattern may be analyzed when there is a predetermined amount of heart rate information stored in the driver profile so that sufficient amount of heart rate data is available to determine heart rate variability. For example, heart rate variability may initially be determined after ten minutes of heart rate data is available. Historical heart rate information may be obtained from a device worn or carried by the driver when the vehicle is not being driven. In particular, heart rate information may be obtained from a smartwatch or other heart rate monitor device worn or carried by the driver while the driver is not driving a vehicle. When the driver begins operating the vehicle the prior accumulated heart rate information from the smartwatch or other heart rate monitoring device worn or carried by the driver may begin being used in the determination of heart rate variability. Once heart rate variability begins being determined, heart rate variability may continuously be determined in a moving window of duration in a range of every 10 seconds to 60 seconds.

In S709, other sensors may be used to acquire vehicle information. Vehicle information may include an indication of movement of the steering wheel, vehicle speed and direction relative to the road, as well as traffic and road conditions, distance to other moving vehicles, and other information related to advanced vehicle safety.

In S711, the ECU 105 may detect movement of the steering wheel greater than a threshold angle. The threshold may be an angle of the steering wheel from a neutral position, or may be radius of movement. For example, the ECU 105 may detect movement of the steering wheel to a new angle for a predetermined period of time, such as a few seconds. The ECU 105 may detect movement of the steering wheel between positions that exceed an angle of movement for a predetermined period of time. The angle of movement may be, for example, movement by approximately 5 degrees or 10 degrees. In S713, the angular position of the steering wheel may be determined.

In S715, the ECU 105 may detect that the driver's eyes have moved away from the direction of driving to a left, right, or downward eye gaze direction for a predetermined period of time while the vehicle is moving.

In S717, the ECU 105 may detect that the driver's heart rate variability has changed by a predetermined amount. In some embodiments, the ECU 105 may detect that the driver's heart rate variability has dropped by a predetermined amount below the resting heart rate variability over a predetermined period of time. The heart rate variability may be determined based on historical heart rate measurements measured over a predetermined period of time, such as in a range of one to ten minutes, where recalculations of heart rate variability are performed every five to ten seconds.

In S719, provided results of steering wheel movement, eye movement, and the heart rate variability, as well as head movement and position, body position, facial features, the ECU 105 may classify a driver's state as fatigue, cognitive tunneling, or neither.

In S721, if the driver's state is fatigue, in S725, the ECU 105 may instruct the human machine interface 341 or other vehicle controller to perform an action to mitigate driver fatigue. In some embodiments, a decision as to whether a driver's state is driver tunneling may include a tolerance level. For example, the decision S721 may include a determination that the driver's fatigue state has occurred for a predetermined period of time. In some embodiments, the response may be fed back so that a machine learning model may be trained to determine the most efficient action (action 625 that produces a positive reward 623) to mitigate driver fatigue.

In S723, if the driver's state is cognitive tunneling, in S727, the ECU 105 may instruct the human machine interface 341 to perform an action to mitigate cognitive tunneling. In some embodiments, a decision as to whether a driver's state is cognitive tunneling may include a tolerance level. For example, the decision S723 may include a determination that the driver's cognitive tunneling state has occurred for a predetermined period of time. The decision S723 may also vary depending on exterior vehicle conditions, such as light or no traffic versus heavy traffic, heavy rain, snow, ice. In some embodiments, the response may be fed back so that a machine learning model may be trained to determine the most efficient action (action 625 that produces a positive reward 623) to mitigate cognitive tunneling among auditory cues such as a favorite song, hearing the voice of a family member or a friend, and hearing one's voice. In some embodiments, the action to mitigate cognitive tunneling may vary each occurrence of cognitive tunneling, or be randomly be selected.

Driver monitoring is a dynamic process that continuously cycles through acquiring driver facial information, performing eye tracking, monitoring heart rate, and acquiring vehicle information in order to detect if a driver is in a driver fatigue state or a cognitive tunneling state and in order to take an effective mitigation action.

Numerous modifications and variations of the present invention are possible in light of the above teachings. It is therefore to be understood that within the scope of the appended claims, the invention may be practiced otherwise than as specifically described herein.

The invention claimed is:

1. A driver monitor system for mitigating cognitive tunneling in a vehicle, the system comprising:
at least one in-cabin video camera;
a heart rate monitor for measuring heart rate;
an audio-visual device; and
processing circuitry configured to:
detect eye gaze direction, eye lid position, and head position using images from the at least one in-cabin video camera,
determine heart rate variability based on the measured heart rate, wherein the heart rate variability is measured as variation in beat-to-beat interval of the heart rate,
using the eye gaze direction, eye lid position, head position, and heart rate variability to predict whether a driver is transitioning into a reduced attentional state, wherein the reduced attentional state is a cognitive tunneling state when the attentional state of the driver is deep in thought while tuning out all else when operating the vehicle, wherein the reduced attentional state is a fatigue state when the attentional state of the driver includes closing eyelids for an extended period in combination with yawing or head dropping, wherein the cognitive tunneling state is predicted when a heart rate variability is lower than a resting heart rate variability for the driver, and
output to the audio-visual device one audio-visual cue to mitigate the cognitive tunneling state and output a different cue to mitigate the fatigue state.

2. The driver monitor system of claim 1, further including a first machine learning device,
wherein the audio-video device outputs a verification request of whether or not the driver feels drowsy or is focused on a point other than a driving task, and receives a response to the verification request, and
wherein the eye gaze direction, the eye lid position, the heart rate variability, and the response are fed back to the machine learning device which learns to predict whether the driver is transitioning into a cognitive tunneling state or a fatigue state.

3. The driver monitor system of claim 2, wherein parameters of the first machine learning device that are learned are stored in a memory as a profile associated with the driver.

4. The driver monitor system of claim 3, wherein independent profiles are stored in the memory in association with respective different drivers.

5. The driver monitor system of claim 2, further comprising a steering wheel rotation sensor,
wherein the processing circuitry is further configured to measure the angle and rate of rotation of the steering wheel using the steering wheel rotation sensor,
wherein the angle and rate of rotation of the steering wheel are fed back to the first machine learning device which learns to predict whether the driver is transitioning into a cognitive tunneling state or a fatigue state, and
wherein the angle and rate of rotation of the steering wheel are substantially fixated when the driver is in the cognitive tunneling state.

6. The driver monitor system of claim 2, wherein the processing circuitry further monitors eye movement,
wherein the eye movement is fed back to the first machine learning device which learns to predict whether the driver is transitioning into a cognitive tunneling state or a fatigue state, and
wherein the eye movement of the driver is a lower percentage of closure than a normal percentage of closure when the driver is in the cognitive tunneling state.

7. The driver monitor system of claim 5, further comprising external vehicle sensors,
wherein the processing circuitry uses data from the external vehicle sensors to monitor the position of the vehicle relative to a road,
wherein the position of the vehicle relative to the road is fed back to the first machine learning device which learns to predict whether the driver is transitioning into a cognitive tunneling state or a fatigue state, and
wherein the angle and rate of rotation of the steering wheel are substantially fixated independent of variations in the road direction, as determined by the external vehicle sensors, when the driver is in the cognitive tunneling state.

8. The driver monitor system of claim 2, wherein the processing circuitry further monitors facial blood flow and driver's posture in a car seat, and
wherein the facial blood flow and driver's posture are fed back to the first machine learning device which learns to predict whether the driver is transitioning into a cognitive tunneling state or a fatigue state.

9. The driver monitor system of claim 1, wherein the one audio-visual cue output to the audio-visual device is a first tone output to one ear of the driver and a second different tone output to the other ear of the driver in order to mitigate the cognitive tunneling.

10. The driver monitor system of claim 2, further including a second machine learning device that is trained to determine the one audio-visual cue to mitigate cognitive tunneling.

11. A method mitigating cognitive tunneling in a vehicle with a driver monitor system, the system comprising at least one in-cabin video camera, a heart rate monitor, an audio-visual device, and processing circuitry, the method comprising:
detecting, by the processing circuitry, eye gaze direction, eye lid position, and head position using images from the at least one in-cabin video camera;
determining, by the processing circuitry, heart rate variability using heart rate measured by the heart rate monitor, wherein the heart rate variability is measured as variation in beat-to-beat interval of the heart rate;
using the eye gaze direction, eye lid position, head position, and heart rate variability to predict, by the processing circuitry, whether a driver is transitioning into a reduced attentional state, wherein the reduced attentional state is a cognitive tunneling state when the attentional state of the driver is deep in thought while tuning out all else when operating the vehicle, the reduced attentional state is a fatigue state when the attentional state of the driver includes closing eyelids for an extended period in combination with yawing or head dropping, wherein the cognitive tunneling state is predicted when a heart rate variability is lower than a resting heart rate variability for the driver; and outputting to the audio-visual device one audio-visual cue to mitigate the cognitive tunneling state and outputting a different cue to mitigate the fatigue state.

12. The method of claim 11, further including a first machine learning device, the method further comprising outputting, by the audio-video device, a verification request of whether or not the driver feels drowsy or is focused on a point other than a driving task, and receiving a response to the verification request; and feeding back to the first machine learning device the eye gaze direction, the eye lid position, the heart rate variability, and the response in order to learn to predict whether the driver is transitioning into a cognitive tunneling state or a fatigue state.

13. The method of claim 12, further comprising storing in a memory parameters of the first machine learning device that are learned as a profile associated with the driver.

14. The method of claim 13, wherein the storing in the memory includes storing independent profiles in association with respective different drivers.

15. The method of claim 12, further including a steering wheel rotation sensor, the method further comprising:

measuring, by the processing circuitry, the angle and rate of rotation of the steering wheel using the steering wheel rotation sensor; and feeding back to the first machine learning device the angle and rate of rotation of the steering wheel in order to learn to predict whether the driver is transitioning into a cognitive tunneling state or a fatigue state, wherein the angle and rate of rotation of the steering wheel are substantially fixated when the driver is in the cognitive tunneling state.

16. The method of claim 12, further comprising:
monitoring eye movement; and
feeding back to the first machine learning device the eye movement in order to learn to predict whether the driver is transitioning into a cognitive tunneling state or a fatigue state,
wherein the eye movement of the driver is a lower percentage of closure than a normal percentage of closure when the driver is in the cognitive tunneling state.

17. The method of claim 15, further including external vehicle sensors,
the method further comprises:
using data from the external vehicle sensors to monitor the position of the vehicle relative to a road; and
feeding back to the first machine learning device the position of the vehicle relative to the road in order to learn to predict whether the driver is transitioning into a cognitive tunneling state or a fatigue state,
wherein the angle and rate of rotation of the steering wheel are substantially fixated independent of variations in the road direction, as determined by the external vehicle sensors, when the driver is in the cognitive tunneling state.

18. The method of claim 12, further comprising:
monitoring, by the processing circuitry, facial blood flow and driver's posture in a car seat; and
feeding back to the first machine learning device the facial blood flow and driver's posture in order to learn to predict whether the driver is transitioning into a cognitive tunneling state or a fatigue state.

19. The method of claim 11, wherein the one audio-visual cue output to the audio-visual device is a first tone output to one ear of the driver and a second different tone output to the other ear of the driver in order to mitigate the cognitive tunneling.

20. The method of claim 12, further including a second machine learning device, the method further comprising
training the second machine learning device to determine the one audio-visual cue to mitigate cognitive tunneling.

* * * * *